United States Patent
Chen et al.

(10) Patent No.: US 12,456,166 B2
(45) Date of Patent: Oct. 28, 2025

(54) MAGNETIC PARTICLE IMAGING RECONSTRUCTION METHOD BASED ON NEURAL NETWORK CONSTRAINED BY FORWARD MODEL

(71) Applicant: Xidian University, Xi'an (CN)

(72) Inventors: Xueli Chen, Xi'an (CN); Shenghan Ren, Xi'an (CN); Pengfei Huang, Xi'an (CN); Duofang Chen, Xi'an (CN); Hui Xie, Xi'an (CN); Shouping Zhu, Xi'an (CN); Jie Tian, Xi'an (CN)

(73) Assignee: Xidian University, Xi'an (CN)

( * ) Notice: Subject to any disclaimer, the term of this patent is extended or adjusted under 35 U.S.C. 154(b) by 372 days.

(21) Appl. No.: 18/326,043

(22) Filed: May 31, 2023

(65) Prior Publication Data

US 2024/0062337 A1 Feb. 22, 2024

(30) Foreign Application Priority Data

Aug. 19, 2022 (CN) .......................... 202211002854.4

(51) Int. Cl.
  *G06T 5/10* (2006.01)
  *G01R 33/12* (2006.01)
  *G06T 5/70* (2024.01)
(52) U.S. Cl.
  CPC ............ *G06T 5/10* (2013.01); *G01R 33/1276* (2013.01); *G06T 5/70* (2024.01); *G06T 2207/20084* (2013.01)
(58) Field of Classification Search
  CPC ... G06T 5/10; G06T 5/70; G06T 2207/20084; G01R 33/1276; G01N 27/72; G06F 17/14; G06N 3/02
  See application file for complete search history.

(56) References Cited

U.S. PATENT DOCUMENTS

2019/0285710 A1* 9/2019 Franke ................. A61B 5/05
2020/0066371 A1* 2/2020 Brubaker ............. G16B 15/00
(Continued)

OTHER PUBLICATIONS

Chen, Xiaojun, et al. "The reconstruction of magnetic particle imaging: Current approaches based on the system matrix." Diagnostics 11.5 (2021): 773. (Year: 2021).*

(Continued)

*Primary Examiner* — Andrae S Allison
(74) *Attorney, Agent, or Firm* — Hemisphere Law, PLLC; Zhigang Ma (57) ABSTRACT

In a magnetic particle imaging reconstruction method based on a neural network constrained by a forward model, a system matrix is obtained through calibration, voltage data generated by a specimen is measured, collected data are transformed into a frequency-domain by Fourier transform, frequency features of data are screened by a signal-to-noise ratio threshold, a reconstruction network is built by a Pytorch to realize mapping from one-dimensional voltage data to a multi-dimensional magnetic particle concentration distribution, the system matrix is used as the forward model of magnetic particle imaging, and simulated voltage data is generated according to a reconstructed multi-dimensional magnetic particle concentration distribution, a difference between the simulated voltage data and input voltage data is calculated as a loss function for network parameter updating, a total variation regularization term is added to the loss function, and training parameters and regularization parameters are adjusted to achieve an optimal reconstruction effect.

8 Claims, 3 Drawing Sheets

(56) References Cited

U.S. PATENT DOCUMENTS

2021/0174938 A1\* 6/2021 Park ................. G16H 30/40
2021/0279841 A1\* 9/2021 Liu .................. G06T 3/4046

OTHER PUBLICATIONS

A. Güngör, B. Askin, D. A. Soydan, C. Barış Top and T. Cukur, "Deep Learned Super Resolution of System Matrices for Magnetic Particle Imaging," 2021 43rd Annual International Conference of the IEEE Engineering in Medicine & Biology Society (EMBC), Mexico, 2021, pp. 3749-3752 (Year: 2021).\*

\* cited by examiner

MAGNETIC PARTICLE IMAGING RECONSTRUCTION METHOD BASED ON NEURAL NETWORK CONSTRAINED BY FORWARD MODEL

TECHNICAL FIELD

The disclosure relates to the field of image reconstruction technologies, and particularly to a magnetic particle imaging reconstruction method based on a neural network constrained by a forward model, and a magnetic particle imaging reconstruction system based on a neural network constrained by a forward model.

BACKGROUND

Magnetic particle imaging (MPI) is a novel quantitative functional imaging technology, which uses magnetic nanoparticles as tracers to finally image a concentration distribution of the magnetic nanoparticles. Compared with imaging technologies such as computed tomography (CT) and positron emission tomography (PET), the MPI does not have any ionizing radiation, and has characteristics of high spatial resolution, high temporal resolution, and high sensitivity, and thus the MPI has broad application prospects and good application potential.

At present, there are two main reconstruction methods for magnetic particle imaging. One is an X-Space reconstruction method, which reconstructs directly on voltage signals in a time domain and has a fast reconstruction speed, but frequent deconvolution process in a reconstruction process would amplify noises and cause artifacts. The other method is a system matrix reconstruction method. Compared with the X-Space reconstruction method, a system matrix contains complex magnetic field characteristics and particle characteristics, and can take into account system defects, so the system matrix reconstruction method has a more accurate reconstruction result. However, since the system matrix reconstruction method needs to solve non-restrictive equations, there are still many artifacts in the reconstruction result.

Based on the above analysis, problems and defects in the existing technologies are as follows:

(1) For the existing reconstruction methods for magnetic particle imaging, regardless of the system matrix reconstruction method and the X-Space reconstruction method, their reconstruction results have significant noise interferences, and reconstruction effects needs to be improved; and (2) Traditional neural network training requires a large amount of training data, but existing magnetic particle imaging equipment is expensive and thus has not been widely used, resulting in measurement data are difficult to acquire. There are only dozens of sets of magnetic particle imaging data published on the Internet, which are not enough to train a neural network.

Difficulties of solving the above problems and defects are that: reconstruction qualities of existing magnetic particle imaging need to be improved, and thus the problem of poor reconstruction effect needs to be solved; the training of neural network needs a large number of measured data, but the magnetic particle imaging technology has not been widely used at present, and the magnetic particle imaging equipment is few; and magnetic particle imaging data is scarce, so it is necessary to solve the problem of updating parameters of neural network with a small number or a single sample.

The significance of solving the above problems and defects is that: using Pytorch (generally is a deep learning framework) to realize a neural network constrained by a forward model, and thereby realize reconstruction of single data; and designing a suitable loss function, adding a total variation regularization term, and adjusting regularization parameters, thereby improving the reconstruction quality of magnetic particle imaging.

SUMMARY

A purpose of the disclosure is to provide a magnetic particle imaging reconstruction method based on a neural network constrained by a forward model, to reconstruct single data. The reconstruction quality of magnetic particle imaging can be improved by designing a suitable loss function, adding a total variation regularization term, and adjusting regularization parameters.

A technical solution according to the disclosure is a magnetic particle imaging reconstruction method based on a neural network constrained by a forward model, and the magnetic particle imaging reconstruction method includes:

step (1), calibrating a magnetic particle imaging system by using a magnetic particle sample with a reference concentration (also referred to as standard concentration) to obtain a system matrix and blank-measured data of the magnetic particle imaging system as a background signal;

step (2), scanning a specimen to be measured through the magnetic particle imaging system to obtain voltage data;

step (3), performing Fourier transform on the system matrix and the voltage data obtained by the scanning, to obtain a corresponding frequency-domain distribution;

step (4), calculating signal-to-noise ratios (SNRs) of different frequency components in the corresponding frequency-domain distribution;

step (5), setting a signal-to-noise ratio threshold and performing frequency feature screening, to reduce an influence of noise, thereby generally obtaining voltage data after the frequency feature screening (e.g., as input voltage data) and data of the system matrix after the frequency feature screening;

step (6), building a reconstruction network by using a Pytorch;

step (7), using the data of the system matrix (e.g., obtained after the frequency feature screening) as a forward model of magnetic particle imaging;

step (8), obtaining a loss function and adding a total variation regularization term therein;

step (9), inputting voltage data (e.g., obtained after the frequency feature screening) into the reconstruction network, and updating parameters of the reconstruction network through an Adam optimization algorithm; and step (10), adjusting regularization parameters, to achieve an optimal reconstruction effect.

In an embodiment, the magnetic particle imaging reconstruction method further includes: determining a spatial distribution of magnetic particles in an imaging space based on the reconstruction network after the step (9) and the step (10).

In an embodiment of the disclosure, the building a reconstruction network by using a Pytorch comprises includes that:

the reconstruction network is built through Pytorch programming, the reconstruction network is formed by a framework of one deep convolutional generative adversarial network (DCGAN) generator; in the reconstruction network, five layers of complex deconvolutional networks are used to realize mapping from one-dimensional voltage frequency-domain data to a multi-dimensional magnetic particle concentration distribution, and a complex batch normalization layer and a complex rectified linear unit (ReLU) activation layer are added after each of preceding four layers of the five layers of deconvolutional networks.

In an embodiment of the disclosure, the forward model is as follows:

1) the magnetic particle imaging system is a linear system, a voltage signal generated by all magnetic particles in an imaging space is a weighted sum of unit concentration magnetic particle voltage signals at respective positions, based on which a system matrix reconstruction method realizes reconstruction in a frequency-domain; a received voltage signal u(t) is expressed as voltage data u after the Fourier transform, and a relationship among the u, the system matrix S and a magnetic particle concentration distribution c is expressed as:

$$u=Sc;$$

the system matrix reconstruction method is a process of solving the magnetic particle concentration distribution c in a case of the voltage data u and the system matrix S are known, and a forward propagation model is configured (i.e., structured and arranged) to obtain the voltage data u in a case of the concentration distribution c and the system matrix S are known; and 2) An encoder of a second network uses dilated convolution to increase a receptive field, so as to prevent a problem of gradient vanishing caused by excessively deep network, and a decoder uses a residual network.

In an embodiment of the disclosure, the loss function is processed as follows:

1) optimizing at a pixel level by using a mean square error (MSE) function:

$$L_{MSE}=\text{MSE}(u,S\hat{c})$$

where, u represents a received voltage signal of network input, S represents the system matrix, and ĉ represents a network output, i.e., the magnetic particle concentration distribution; MSE represents a calculation formula of mean square error and is expressed as follows:

$$MSE(u, \hat{u}) = \frac{1}{N}\sum_{i=1}^{N}|u(i) - \hat{u}(i)|^2$$

where, û represents simulated voltage data obtained after calculation based on the network output ĉ through the forward model, i represents a frequency component of voltage signal and i∈ 1, 2 . . . , N, and N represents a total number of frequency component;

2) performing de-noising optimization by using total variation regularization:

$$L_{tv}=V(\hat{c})$$

where, V represents a calculation formula of total variation and is expressed as follows:

$$V(\hat{c}) = \sum_{j,k}\sqrt{|\hat{c}_{j+1,k} - \hat{c}_{j,k}|^2 + |\hat{c}_{j,k+1} - \hat{c}_{j,k}|^2}$$

where, $\hat{c}_{j,k}$ represents a magnetic particle concentration at a spatial position (j,k); and 3) obtaining a resultant loss function as follows:

$$L=L_{MSE}+\lambda L_{tv}$$

where, λ represents a total variation coefficient and is set to be $10^{-6}$.

In an embodiment of the disclosure, the updating the parameters of the reconstruction network through an Adam optimization algorithm includes:

1) reconstructing a spatial distribution of magnetic particle concentration by using a complex deconvolutional network; and 2) setting a learning rate to be $10^{-4}$.

Features of the disclosure include: by adding the forward model of magnetic particle imaging into the neural network as a constraint, it is feasible to train parameters in the neural network by using only single measured data; and moreover, by adding the total variation regularization term to the loss function of network, by means of adjustment of regularization parameters, the noise influence in the reconstruction result can be weakened.

Beneficial effects of the disclosure may be as follows: the embodiments of the disclosure obtain measured data of a specimen and data of a system matrix; perform Fourier transform on the system matrix and voltage data obtained by scanning to obtain a corresponding frequency-domain distribution; based on the system matrix and blank-measured data, calculate signal-to-noise ratios of different frequency components respectively and set a signal-to-noise ratio threshold to remove a frequency component with a relatively low signal-to-noise ratio; built a reconstruction network based on the Pytorch 3.8; use the system matrix as a forward model of magnetic particle imaging; provide a loss function and add a total variation regularization term in the loss function; input obtained voltage data and the data of the system matrix into the reconstruction network, and use the Adam optimization algorithm to update parameters of the network; and adjust regularization parameters to achieve an optimal reconstruction effect. The embodiments of the disclosure can be applied for reconstruction of magnetic particle imaging based on a system matrix reconstruction method, and the magnetic particle imaging reconstruction based on a neural network constrained by the forward model is realized by using the forward model. The magnetic particle imaging reconstruction method based on the neural network constrained by the forward model according to the disclosure can realize the magnetic particle imaging reconstruction based on the neural network constrained by the forward model, and image reconstruction quality can be improved by adjusting regularization parameters in the loss function.

BRIEF DESCRIPTION OF DRAWINGS

In FIG. 2, the reference numeral 1 denotes a magnetic particle imaging data acquisition module, the reference numeral 2 denotes a magnetic particle imaging data processing module, the reference numeral 3 denotes a network reconstruction module, and the reference numeral 4 denotes a forward propagation module.

DETAILED DESCRIPTION OF EMBODIMENTS

In order to make the purpose, technical solutions, and advantages of the disclosure clearer, the following will provide a further detailed explanation of the disclosure in combination with embodiments. It should be understood that the specific embodiments described herein are merely intended to explain the disclosure and are not intended to limit the disclosure.

Aiming at the problems in the prior art, embodiments of the disclosure provide magnetic particle imaging reconstruction method and system based on a neural network constrained by a forward model. The following is a detailed description of the disclosure in combination with the attached drawings.

Figure 1:
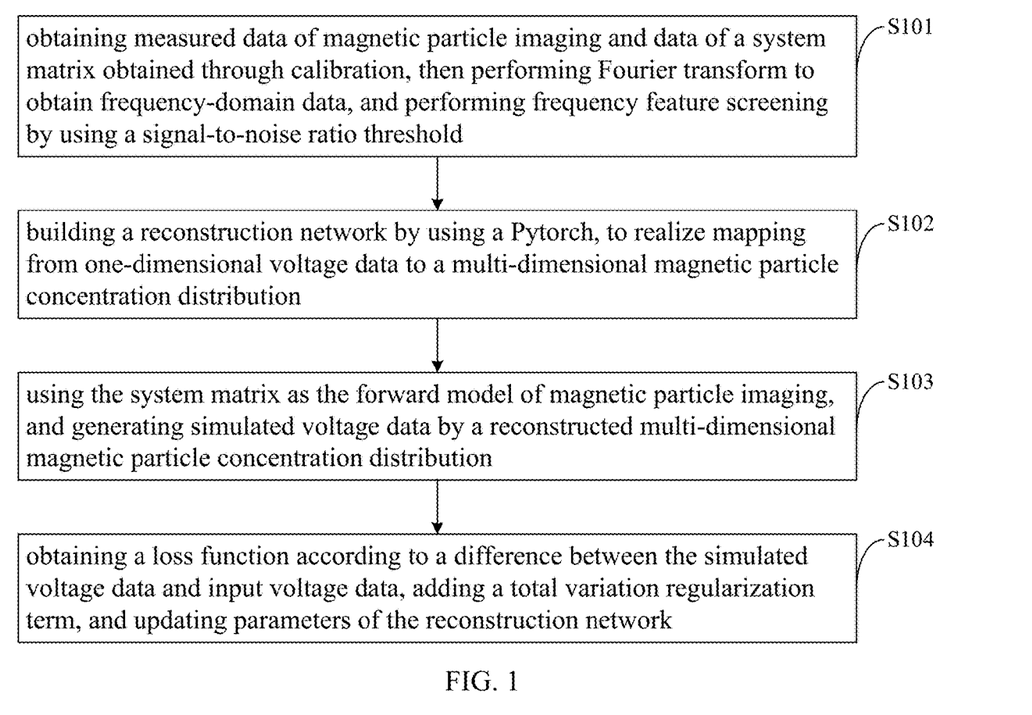
FIG. 1 illustrates a magnetic particle imaging reconstruction method based on a neural network constrained by a forward model according to an embodiment of the disclosure.

As shown in FIG. 1, a magnetic particle imaging reconstruction method based on a neural network constrained by a forward model according to an embodiment the disclosure, includes:
- step S101: obtaining measured data of magnetic particle imaging and data of a system matrix obtained through calibration, then performing Fourier transform to obtain frequency-domain data, and performing frequency feature screening by a signal-to-noise ratio threshold;
- step S102: building a reconstruction network by using a Pytorch, to realize mapping from one-dimensional voltage data to a multi-dimensional magnetic particle concentration distribution;
- step S103: using the system matrix as the forward model of magnetic particle imaging, and generating simulated voltage data by a reconstructed multi-dimensional magnetic particle concentration distribution; and
- step S104: obtaining a loss function according to a difference between the simulated voltage data and input voltage data, adding a total variation norm (e.g., total variation regularization term) of concentration, and updating parameters of the reconstruction network.

The magnetic particle imaging reconstruction method based on the neural network constrained by the forward model provided by the disclosure can be implemented using other steps by those ordinary skilled in the art, and thus the magnetic particle imaging reconstruction method based on the neural network constrained by the forward model as shown in FIG. 1 is merely a specific embodiment for the purpose of illustration.

Figure 2:
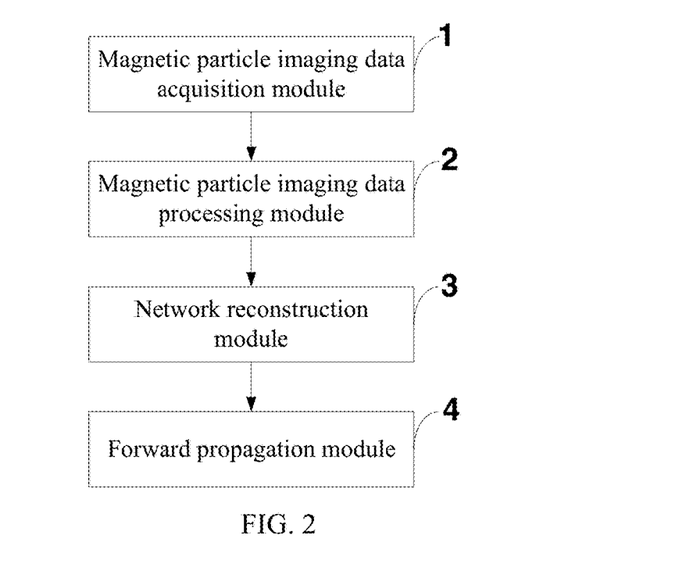
FIG. 2 illustrates a structural diagram of a magnetic particle imaging reconstruction system based on a neural network constrained by a forward model according to an embodiment of the disclosure.

As shown in FIG. 2, a magnetic particle imaging reconstruction method based on a neural network constrained by a forward model according to an embodiment of the disclosure includes:
- a magnetic particle imaging data acquisition module 1, configured (i.e., structured and arranged) to obtain magnetic particle scanning data (also referred to as magnetic particle imaging data) and data of a system matrix obtained through calibration (of a magnetic particle imaging system);
- a magnetic particle imaging data processing module 2, configured to perform Fourier transform on collected magnetic particle imaging data and perform frequency feature screening based on a signal-to-noise ratio threshold;
- a network reconstruction module 3, configured to build a reconstruction network by using a Pytorch; and
- a forward propagation module 4, configured to obtain frequency-domain data of voltage corresponding to a magnetic particle distribution.

The following is a further description of the technical solutions of the disclosure in combination with the attached drawings.

A magnetic particle imaging reconstruction method based on the neural network constrained by the forward model according to an embodiment of the disclosure may specifically include:
- step (1), calibrating a magnetic particle imaging system by using a magnetic particle sample with a reference concentration (also referred to as standard concentration) to obtain a system matrix and blank-measured data of the magnetic particle imaging system as a background signal;
- step (2), scanning a specimen to be measured using the magnetic particle imaging system, to obtain voltage data;
- step (3), performing Fourier transform on the system matrix and the voltage data obtained by the scanning, to obtain a corresponding frequency-domain distribution;
- step (4), calculating signal-to-noise ratios of different frequency components (in the corresponding frequency-domain distribution), respectively;
- step (5), setting a signal-to-noise ratio threshold to perform frequency feature screening, to reduce an influence of noise, thereby generally obtaining voltage data after the frequency feature screening (e.g., as input voltage data) and data of the system matrix after the frequency feature screening;
- step (6), building a reconstruction network by using a Pytorch;
- step (7), using the data of the system matrix (e.g., obtained after the frequency feature screening) as the forward model of magnetic particle imaging;
- step (8), providing a loss function and adding a total variation regularization term therein;
- step (9), inputting voltage data (obtained after the frequency feature screening performed in the step (5)) into the reconstruction network, and updating parameters of the reconstruction network through an Adam optimization algorithm; and
- step (10), adjusting regularization parameters, to achieve an optimal reconstruction effect.

Figure 3:
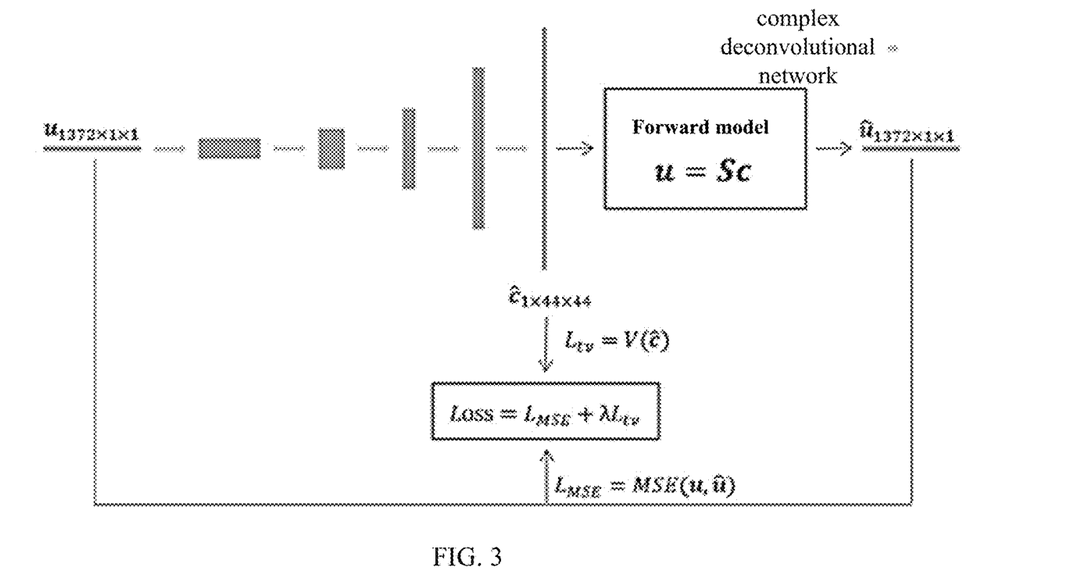
FIG. 3 illustrates a structural diagram of a neural network according to an embodiment of the disclosure.

In an embodiment of the disclosure, in the step (6), the building a reconstruction network by using a Pytorch includes that:
the reconstruction network is built through Pytorch programming, the framework of the reconstruction network is shown in FIG. 3, the reconstruction network is formed by a framework of one deep convolution generative adversarial network (DCGAN) generator; and in the reconstruction network, five layers of complex deconvolutional networks are used to realize mapping from the one-dimensional voltage data to the multi-dimensional magnetic particle concentration distribution, and a complex batch normalization layer and a complex rectified linear unit (ReLU) activation layer are added after each of the preceding four layers of the five layers of deconvolutional networks.

In an embodiment of the disclosure, in the step (7), the forward model is as follows.

1) the magnetic particle imaging system is a linear system, a voltage signal generated by all magnetic particles in an imaging space is a weighted sum of unit concentration magnetic particle voltage signals at respective positions, based on which a system matrix reconstruction method realizes reconstruction in a frequency-domain. A received voltage signal u(t) is expressed as voltage data u after the Fourier transform, and a relationship among the u, the system matrix S and a magnetic particle concentration distribution c is expressed as:

$$u=Sc;$$

the system matrix reconstruction method is a process of solving the magnetic particle concentration distribution c in a case of the u and the system matrix S are known; and the forward model is used to obtain the voltage data u in a case of the concentration distribution c and the system matrix S are known.

2) An encoder of a second network uses dilated convolution to increase a receptive field, so as to prevent the problem of gradient vanishing caused by too deep network; and a decoder uses a residual network.

In an embodiment of the disclosure, in the step (8), the loss function is processed as follows:

1) optimizing at a pixel level by using a mean square error function as follows:

$$L_{MSE}=MSE(u,S\hat{c})$$

where, u represents a received voltage signal of network input, i.e., generally referred to as input voltage data, S represents the system matrix, and ĉ represents a network output, i.e., the magnetic particle concentration distribution; MSE represents a calculation formula of mean square error and is expressed as follows:

$$MSE(u, \hat{u}) = \frac{1}{N}\sum_{i=1}^{N}|u(i)-\hat{u}(i)|^2$$

where, û represents voltage data obtained after calculation based on the network output ĉ through the forward model, i.e., generally referred to as simulated voltage data, i represents a frequency component of voltage and i∈1, 2 . . . , N, and N represents a total number of frequency component;

2) performing de-noising optimization by using total variation regularization:

$$L_{tv}=V(\hat{c})$$

where, V represents a calculation formula of total variation and is expressed as follows:

$$V(\hat{c}) = \sum_{j,k}\sqrt{|\hat{c}_{j+1,k}-\hat{c}_{j,k}|^2+|\hat{c}_{j,k+1}-\hat{c}_{j,k}|^2}$$

where, $\hat{c}_{j,k}$ represents a magnetic particle concentration at a spatial position (j,k); and 3) obtaining a resultant loss function as follow:

$$L=L_{MSE}+\lambda L_{tv}$$

where, λ represents a total variation coefficient and is set to be 10e-6.

In an embodiment of the disclosure, in the step (9), the updating parameters of the reconstruction network through an Adam optimization algorithm includes:

1) reconstructing a spatial distribution of magnetic particle concentration by using a complex deconvolutional network; and
2) setting a learning rate to be 10e-4.

The following provides a detailed description of technical effects of the disclosure in combination with tests.

In an embodiment of the disclosure, in the step (9), reconstruction is performed on simulated data to evaluate performance of the algorithm, and a process is carried out as follows.

1) the simulated data used in the embodiment of the disclosure is generated based on a measured system matrix; and
2) the embodiment of the disclosure calculates a mean square error and a structural similarity according to the simulated data to evaluate the reconstruction effect, and a calculation formula of mean square error is as follows:

$$MSE = \frac{1}{MN}\sum_{i=1}^{M}\sum_{j=1}^{N}|\hat{c}(i,j)-c(i,j)|^2$$

where, M, N respectively represent numbers of row sampling points and column sampling points in reconstruction result and actual magnetic particle spaces, ĉ(i,j) represents a concentration value of reconstruction result at a position (i,j), and c(i,j) represents a concentration value of actual magnetic particle at the position (i,j).

The embodiment of the disclosure uses the structural similarity to evaluate the reconstruction effect of the reconstruction method, and a calculation formula for the structural similarity is as follows:

$$SSIM(\hat{c},c)=l(\hat{c},c)^{\alpha}c(\hat{c},c)^{\beta}s(\hat{c},c)^{\gamma}$$

and in the formula:

$$l(\hat{c}, c) = \frac{2u_{\hat{c}}u_c + c_1}{u_{\hat{c}}^2 + u_c^2 + c_1}$$

$$c(\hat{c}, c) = \frac{2\sigma_{\hat{c}}\sigma_c + c_2}{\sigma_{\hat{c}}^2 + \sigma_c^2 + c_2}$$

$$s(\hat{c}, c) = \frac{\sigma_{\hat{c}c} + c_3}{\sigma_{\hat{c}}\sigma_c + c_3}$$

where, $u_{\hat{c}}$ represents an average value of reconstruction result ĉ of magnetic particle concentration distribution; $u_c$ represents an average value of actual magnetic particle concentration distribution c; $\sigma_{\hat{c}}$ and $\sigma_c$ represent standard deviations of the two kinds of concentration distributions (i.e., ĉ and c) respectively; $\sigma_{\hat{c}c}$ represents a covariance of the two kinds of concentration distributions; l(ĉ,c) represents a comparison function of luminance the two kinds of concentration distributions; c(ĉ,c) represents a comparison function of contrast ratio of the two kinds of concentration distributions; s(ĉ,c) represents a comparison function of structure of the two kinds of concentration distributions; $c_1$, $c_2$, and $c_3$ are introduced parameters for adjusting instability when denominators approach zero; SSIM represents an index that combines the brightness, the contrast ratio, and the structure. In practical applications, each of α, β and γ is usually set to 1, $c_1=(K_1L)^2$, $c_2=(K_2 L)^2$, $c_3=c_2/2$, $K_1$ is usually set to 0.01 and $K_2$ is usually set to 0.03, L represents a maximum value of pixel; and the above calculation formula for the structural similarity can be simplified as:

$$SSIM(\hat{c}, c) = \frac{2u_{\hat{c}}u_c + c_1}{u_{\hat{c}}^2 + u_c^2 + c_1} \cdot \frac{2\sigma_{\hat{c}c} + c_2}{\sigma_{\hat{c}}^2 + \sigma_c^2 + c_2}$$

Figure 4A:
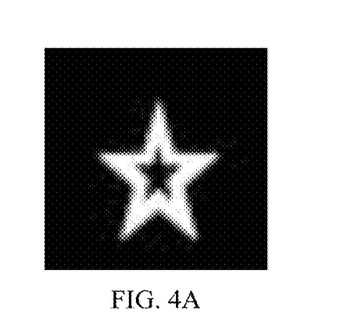
FIG. 4A illustrates an actual magnetic particle concentration distribution diagram.
Figure 4B:
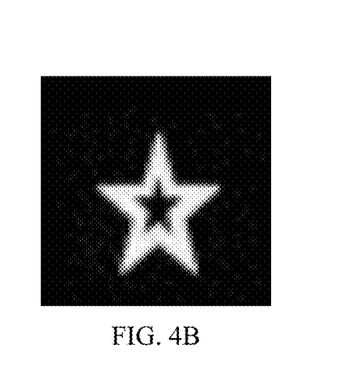
FIG. 4B illustrates a reconstruction result diagram of the actual magnetic particle concentration distribution.
Figure 5A:
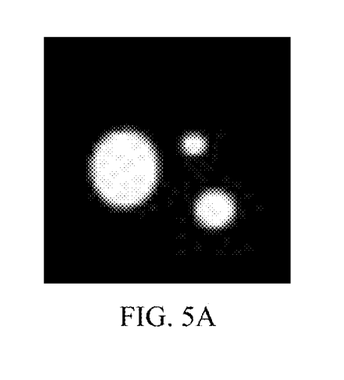
FIG. 5A illustrates another actual magnetic particle concentration distribution diagram.
Figure 5B:
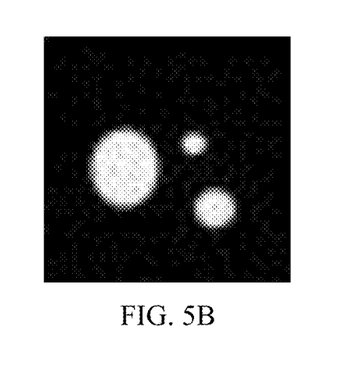
FIG. 5B illustrates a reconstruction result diagram of the another actual magnetic particle concentration distribution.

FIGS. 4A-4B and FIGS. 5A-5B illustrate actual magnetic particle concentration distributions and reconstruction results of simulated data according to the disclosure. Specifically, FIG. 4A and FIG. 5A illustrate the actual magnetic particle concentration distributions, FIG. 4B and FIG. 5B illustrate the reconstruction results according to the disclosure. It can be seen that the reconstruction results are highly consistent with the respective actual magnetic particle concentration distributions, and have only a little noise. TABLE 1 shows the mean square errors and structural similarities of reconstruction results of the algebra reconstruction technique (ART) iterative algorithm and the disclosure. It can be seen that: the magnetic particle imaging reconstruction method based on the neural network constrained by the forward model of the disclosure significantly improves the reconstruction effect of magnetic particle imaging.

TABLE 1

Comparison of experimental results of mean square errors and structural similarities

| Reconstruction method | Mean square error | Structural similarity |
| --- | --- | --- |
| ART iterative algorithm | 206.26 | 0.531 |
| The disclosure | 149.18 | 0.745 |

It should be noted that embodiments of the disclosure can be embodied through hardware, software, or a combination of software and hardware. The hardware may be implemented using a dedicated logic. The software may be may be stored in a memory and executed by a suitable instruction execution system such as a microprocessor or a specific designed hardware. Those ordinary skilled in the art should understand that the above system and method can be implemented using computer executable instructions and/or control codes contained in a processor, and for example, the codes are provided on a carrier medium such as a magnetic disk, a CD or a DVD-ROM, on a programmable memory such as a read-only memory (firmware), or on a data carrier such as an optical or electronic signal carrier. The system and its modules of the disclosure can be implemented by a hardware circuit such as a very large-scale integrated circuit or a gate array, a semiconductor such as a logic chip or transistors, or a programmable hardware device such as a field programmable gate array or a programmable logic device, etc., or by software executed by various types of processors, or by a combination of the aforementioned hardware circuit and software, such as firmware.

The foregoing is merely specific embodiments of the disclosure, but the scope of protection of the disclosure is not limited to these. Any modifications, equivalent substitutions, and improvements made by those ordinary skilled in the art within the spirit and principle of the disclosure should be included in the scope of protection of the disclosure.

What is claimed is:

1. A magnetic particle imaging reconstruction method based on a neural network constrained by a forward model, comprising:
   step 1: obtaining measured data of magnetic particle imaging and data of a system matrix obtained through calibration, then performing Fourier transform to obtain frequency-domain data, and performing frequency feature screening by using a signal-to-noise ratio threshold;
   step 2: building a reconstruction network by using a Pytorch, to realize mapping from one-dimensional voltage data to a multi-dimensional magnetic particle concentration distribution;
   step 3: using the system matrix as the forward model of magnetic particle imaging, and generating simulated voltage data by a reconstructed multi-dimensional magnetic particle concentration distribution; and
   step 4: obtaining a loss function according to a difference between the simulated voltage data and input voltage data, adding a total variation norm of concentration, and updating parameters of the reconstruction network.

2. The magnetic particle imaging reconstruction method based on the neural network constrained by the forward model as claimed in claim 1, wherein the step 1 specifically comprises:
   sub-step 1.1: calibrating a magnetic particle imaging system by using a magnetic particle sample with a reference concentration to obtain the system matrix and blank-measured data of the magnetic particle imaging system as a background signal;
   sub-step 1.2: scanning a specimen to be measured through the magnetic particle imaging system to obtain voltage data;
   sub-step 1.3: performing the Fourier transform on the system matrix and the voltage data obtained by the scanning to obtain a corresponding frequency-domain distribution;
   sub-step 1.4: calculating signal-to-noise ratios of different frequency components; and
   sub-step 1.5: setting the signal-to-noise ratio threshold and performing the frequency feature screening, to reduce an influence of noise.

3. The magnetic particle imaging reconstruction method based on the neural network constrained by the forward model as claimed in claim 1, wherein the step 4 comprises:
   sub-step 4.1: adding a total variation regularization term in the loss function;
   sub-step 4.2: inputting voltage data obtained after the frequency feature screening as the input voltage data into the reconstruction network, and updating the parameters of the reconstruction network through an Adam optimization algorithm; and
   sub-step 4.3: adjusting regularization parameters, to achieve an optimal reconstruction effect.

4. The magnetic particle imaging reconstruction method based on the neural network constrained by the forward model as claimed in claim 2, wherein in the step 2, the building a reconstruction network by using a Pytorch comprises:
   using the Pytorch to build the reconstruction network, wherein the reconstruction network is formed by a framework of one deep convolution generative adversarial network (DCGAN) generator; and in the reconstruction network, five layers of complex deconvolutional networks are used to realize the mapping from the one-dimensional voltage data to the multi-dimensional magnetic particle concentration distribution, and a complex batch normalization layer and a complex rectified linear unit (ReLU) activation layer are added after each of preceding four layers of the five layers of deconvolutional networks.

5. The magnetic particle imaging reconstruction method based on the neural network constrained by the forward model as claimed in claim 2, wherein in the step 3, the forward model is as follows:

the magnetic particle imaging system is a linear system, a voltage signal generated by all magnetic particles in an imaging space is a weighted sum of unit concentration magnetic particle voltage signals at respective positions, based on which a system matrix reconstruction method realizes reconstruction in a frequency-domain; a received voltage signal u(t) is expressed as voltage data u after the Fourier transform, and a relationship among the voltage data u, the system matrix S and a magnetic particle concentration distribution c is expressed as:

$u=Sc;$ the system matrix reconstruction method is a process of solving the magnetic particle concentration distribution c in a case of the voltage data u and the system matrix S are known, and the forward model is configured to solve the voltage data u in a case of the magnetic particle concentration distribution c and the system matrix S are known.

6. The magnetic particle imaging reconstruction method based on the neural network constrained by the forward model as claimed in claim 3, wherein in the sub-step 4.1, the loss function is processed as follows:

1) optimizing at a pixel level by using a mean square error function:

$L_{MSE}=\mathrm{MSE}(u,S\hat{c})$ where, u represents a received voltage signal of network input, S represents the system matrix, and ĉ represents a network output, namely, a magnetic particle concentration distribution; MSE represents a calculation formula of mean square error and is expressed as follows:

$$MSE(u, \hat{u}) = \frac{1}{N}\sum_{i=1}^{N}|u(i) - \hat{u}(i)|^2$$

where, û represents the simulated voltage data obtained after calculation based on the network output ĉ through the forward model, i represents a frequency component of voltage and i∈1, 2 . . . , N, and N represents a total number of frequency component;

2) performing de-noising optimization by using total variation regularization:

$L_{tv}=V(\hat{c})$ where, V represents a calculation formula of total variation and is expressed as follows:

$$V(\hat{c}) = \sum_{j,k}\sqrt{|\hat{c}_{j+1,k} - \hat{c}_{j,k}|^2 + |\hat{c}_{j,k+1} - \hat{c}_{j,k}|^2}$$

where, $\hat{c}_{j,k}$ represents a magnetic particle concentration at a spatial position (j,k); and 3) obtaining a resultant loss function as follows:

$L=L_{MSE}+\lambda L_{tv}$ where, λ represents a total variation coefficient and is set to $10^{-6}$.

7. The magnetic particle imaging reconstruction method based on the neural network constrained by the forward model as claimed in claim 3, wherein in the sub-step 4.2, the updating the parameters of the reconstruction network through an Adam optimization algorithm comprises:

1) reconstructing a spatial distribution of magnetic particle concentration by using a complex deconvolutional network; and 2) setting a learning rate to be $10^{-4}$.

8. The magnetic particle imaging reconstruction method based on the neural network constrained by the forward model as claimed in claim 1, further comprising:

determining a spatial distribution of magnetic particles in an imaging space based on the reconstruction network after the step 4.

* * * * *